Figure 1:
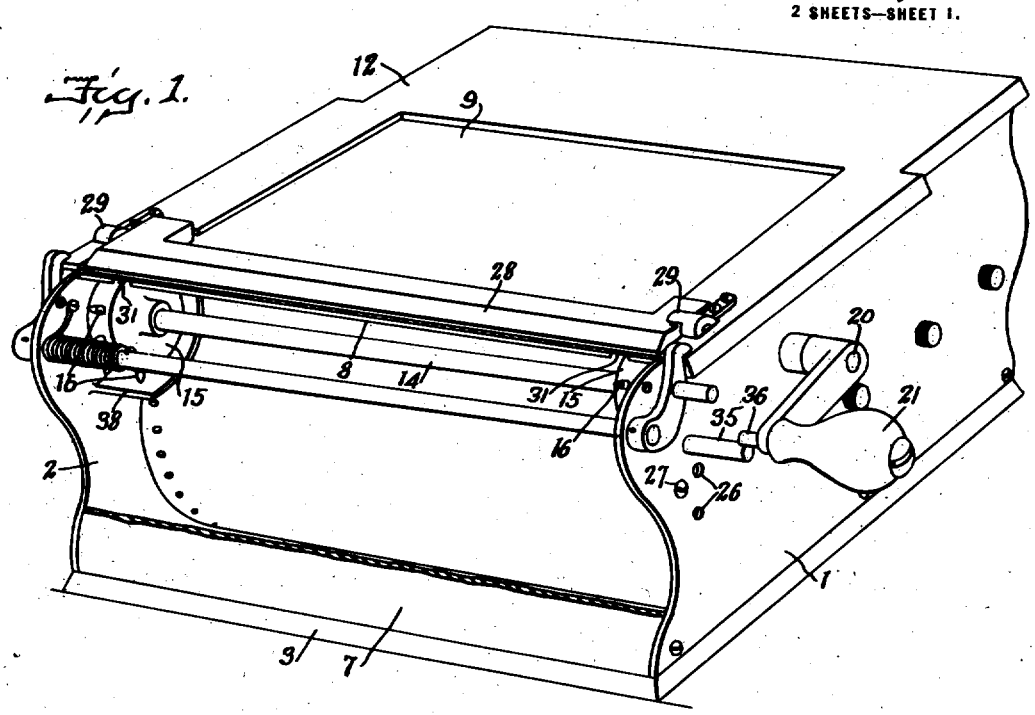

A. C. V. MALM.

MANIFOLDING DEVICE.

APPLICATION FILED JULY 18, 1919.

Reissued Mar. 29, 1921.

15,074.

2 SHEETS—SHEET 1.

Inventor

Axel C. V. Malm,

Toulmin & Toulmin.

Attorneys

A. C. V. MALM.

MANIFOLDING DEVICE.

APPLICATION FILED JULY 18, 1919.

Reissued Mar. 29, 1921.

15,074.

2 SHEETS—SHEET 2.

Inventor

Axel C. V. Malm,

Toulmin & Toulmin,

Attorneys

UNITED STATES PATENT OFFICE.

AXEL C. V. MALM, OF PHILADELPHIA, PENNSYLVANIA, ASSIGNOR TO THE EGRY REGISTER COMPANY, OF DAYTON, OHIO, A CORPORATION OF OHIO.

MANIFOLDING DEVICE.

15,074. Specification of Reissued Letters Patent. Reissued Mar. 29, 1921.

Original No. 1,246,632, dated November 13, 1917, Serial No. 31,317, filed June 1, 1915. Application for reissue filed July 18, 1919. Serial No. 311,880.

*To all whom it may concern:*

Be it known that I, AXEL C. V. MALM, a citizen of the United States of America, residing at Philadelphia, in the county of Philadelphia and State of Pennsylvania, have invented new and useful Improvements in Manifolding Devices, of which the following is a specification, reference being had therein to the accompanying drawings.

This invention relates to manifolding devices and more particularly to that type of manifolding devices known as autographic registers. In autographic registers of this kind the paper is fed over the writing table by various kinds of feeding devices, the problem being always to feed the several webs of paper equal distances on each operation of the feeding mechanism and to maintain the several webs of paper in exact superimposed relation during the feeding and severing operation, in order that the printed forms on the several webs may be in exact alinement. In order to accurately retain the webs in proper superimposed relation it has been proposed to provide a feeding device comprising a rotary member extending across the front of the machine beneath the writing table and having two circumferential series of pins, which pins are adapted to enter openings arranged lengthwise of the webs along the lateral edges thereof, thus advancing the webs simultaneously and to exactly the same extent.

To accomplish the full purpose of this arrangement it is essential that the paper web be held in exact relation to the feeding devices both in the feeding and severing operations, as either longitudinal or lateral displacement of the web relative to the feeding device would immediately affect the alinement of the forms printed on the paper with the writing table.

Much difficulty has been experienced, however, in providing a device of this kind which is satisfactory in operation as it has been found very difficult to hold the paper during tearing operation in such a manner as to prevent its being displaced and it has been found that the openings which are in engagement with the pins are torn. Further, there is a tendency for the pins to escape from the perforations. As a result of these disadvantages machines of this kind have not gone into extensive use.

The object of this invention is to provide a simple and economical organization of parts whereby writing material in manifold form can be smoothly and evenly advanced without displacement or disarrangement of the superimposed webs and then properly severed. In addition to the above object it is also contemplated to provide a device whereby the writing material is advanced equal distances at each operation and also to provide an arrangement whereby the amount of writing material advanced at each operation can be varied.

Figure 5:
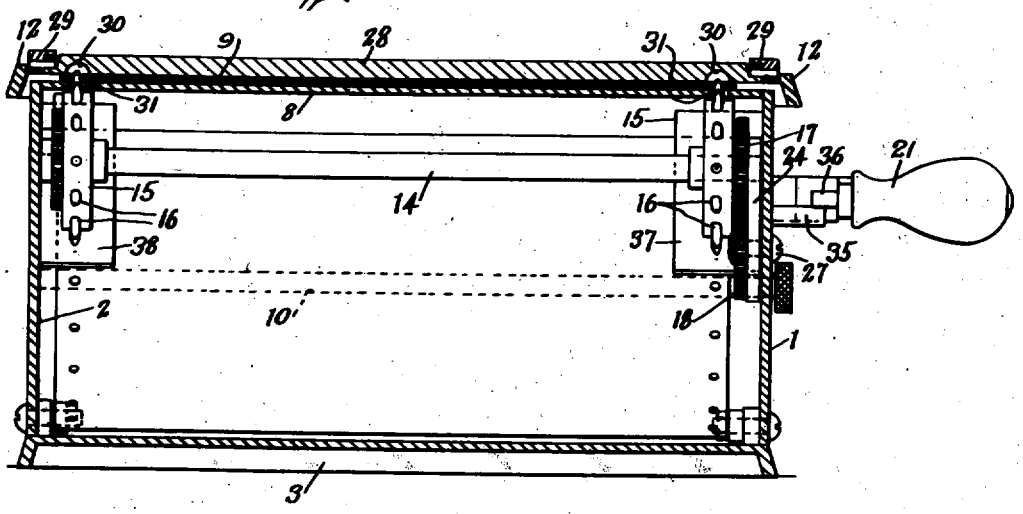
Figures 2, 3, 4, 6:
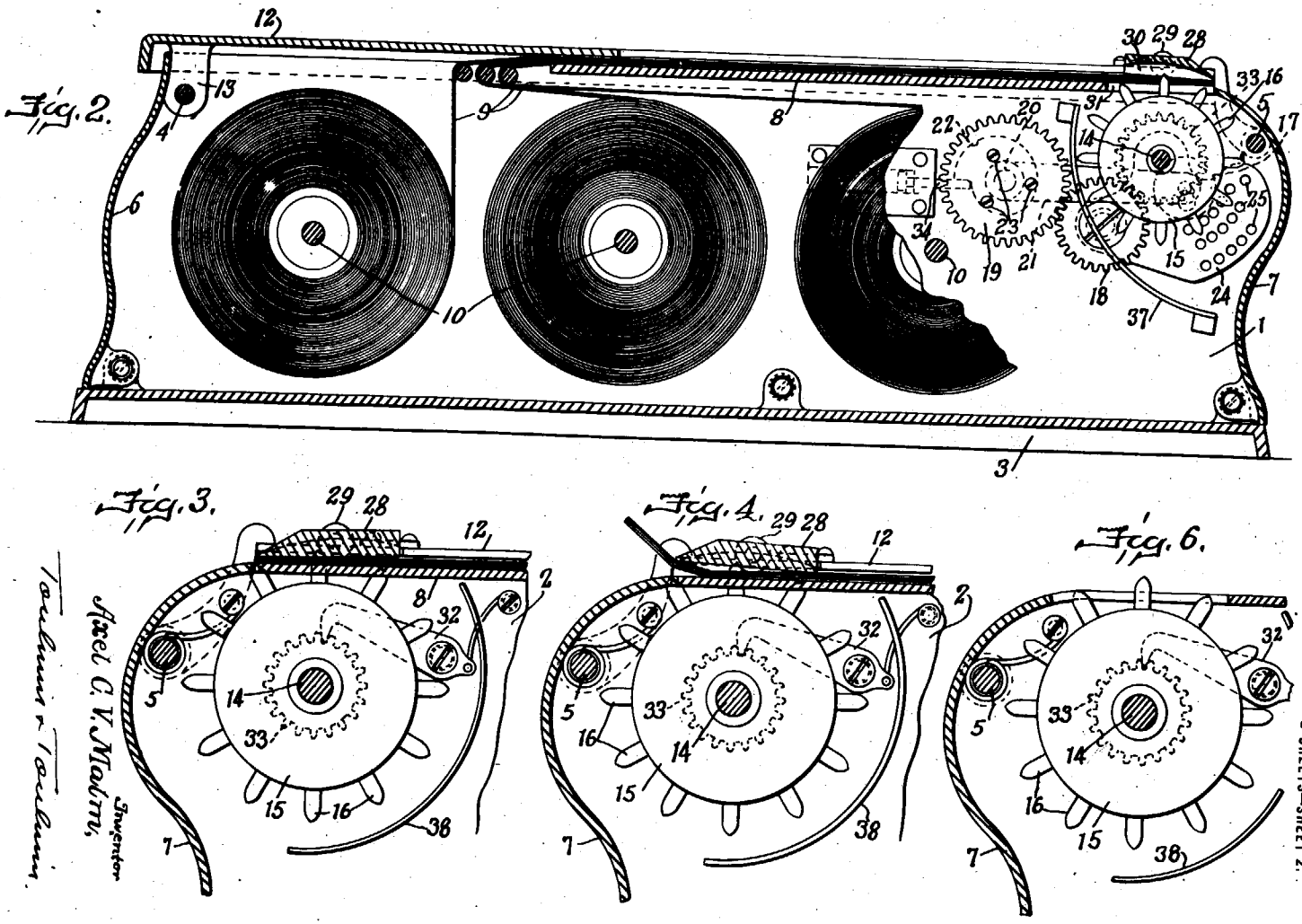

In the accompanying drawings, Figure 1 is a perspective view of an autographic register embodying my invention with the ends broken away; Fig. 2 is a longitudinal, sectional view of such a register, showing the gearing for the feeding mechanism; Fig. 3 is a longitudinal, sectional view of the forward portion of such a register showing the holding device in its normal or inoperative position; Fig. 4 is a view similar to Fig. 3 showing the holding device in its operative position; Fig. 5 is a transverse sectional view taken through the holding device and feeding mechanism; and Fig. 6 is a detail view of the web supporting plate and the relation thereto of the web and the web feeding device.

In these drawings I have illustrated one embodiment of my invention and have shown the same as comprising a frame consisting of side members 1 and 2 connected one to the other at their lower edges by means of a base 3 and at their upper edges by means of tie rods 4 and 5 and also connected by means of end plates or closures 6 and 7, thus providing a very rigid frame. Mounted on the upper part of this frame near the forward end thereof is a paper support 8, over which is drawn a plurality of webs of paper between which may be interposed transfer material, such as carbon paper. These webs of paper, as shown at 9, are drawn from rolls mounted upon shafts 10, the ends of which are mounted in the side members 1 and 2 of the frame. The manner of carrying the webs across the paper support and of interleaving the carbon sheets between the same is well known and need not be here described in detail. The upper portion of the frame is provided with a closure 12 which is preferably hinged thereto and, in the present instance, is shown as provided with lugs 13 mounted on the tie bar 4 at the rear end of the machine. In this type of the machine the paper support 8 constitutes a writing table and the cover 12 is cut away above the writing table 8 to expose a portion of the uppermost web which rests upon the table, to enable said web to be written upon.

A suitable feeding device is provided for drawing the web simultaneously from the several rolls and moving the same across the writing table or support 8. In the present machine this operation is accomplished by means of a rotary feeding device comprising a shaft 14 journaled in the side members 1 and 2 of the main frame and having mounted thereon near the respective side members two disk like members 15, each of which is provided with a circumferential series of teeth 16 which are adapted to enter openings formed along the respective edges of the webs of paper, as shown in the drawings. Movement may be imparted to this rotary feeding device in any desired manner but it is preferable that the feeding device should be moved, upon each operation, a distance sufficient to advance the webs of paper equal to the length of one bill. I have, therefore, provided the shaft 14 with a gear 17 which is connected by means of an intermediate gear 18 with a gear 19 mounted on a shaft 20 journaled in the side member 1 of the main frame and having secured to its outer end a handle 21. The ratio of the gearing 17, 18 and 19 is such that one revolution of the handle 21 will advance the webs the desired distance.

Inasmuch as the length of the checks or bills vary and it is sometimes desired to change the machine for the use of a different size bill I have provided for changing the ratio of the gearing to cause different movements to be imparted to the rotary feeding device. In the present instance I have made the gear 19 removable so that gears having different numbers of teeth may be substituted therefor. In the present construction a disk 22, which also constitutes a cam, as will be hereinafter described, is rigidly secured to the shaft 20 and the gear 19 is secured thereto by means of screws 23 which are readily removable to permit the removal of the gear. The variation in the diameter of the gear 19 makes it necessary to vary the position of the intermediate gear 18 in order that it may mesh both with the gear 19 and with the gear 17. I have, therefore, mounted the gear 18 upon a swinging support 24 mounted for movement about the axis of the gear 17. In the present instance this support is in the form of a plate which is mounted on the shaft 14 between the disk-like member of the feeding device and the side member of the frame 1. By thus swinging the gear 18 about the axis of the gear 17 it will be apparent that it will remain in mesh with the gear 17 but may be placed at different distances from the axis of the gear 19. In order to retain the intermediate gear in adjusted positions I have provided the plate with a plurality of openings 25 which are here shown as arranged in three series, each series being concentric to the axis of the gear. The side frame member 1 is a provided with a series of openings 26 so arranged with relation to the plate 24 that some of the openings 25 will register with one of the openings 26 when the intermediate gear is in any one of its adjusted positions, thus enabling the plate 24 to be secured in this adjusted position by means of a screw 27 extending through the side member of the frame and into the opening in the plate 24. In this manner the ratio of the gearing can be readily adjusted to vary the throw of the feeding mechanism to feed checks or bills of various lengths, say from three and a half to eleven inches, and that this change can be made without sending the machine to the factory and by unskilled workmen, it being only necessary to remove the one gear, substitute another therefor and make the proper adjustment of the intermediate gear.

After the written bill has been fed from the machine it is customary to sever the same by a tearing operation, a suitable tearing edge being provided on the forward edge of the machine to sever the paper. Some means are preferably provided for holding the several webs of paper against displacement during this tearing operation, otherwise the pull on the paper which is being torn would tend to displace the webs relatively one to the other. It is desirable that this holding device should require no unnecessary attention on the part of the operator.

In the present instance I have provided feeding devices of suitable character which, in combination with the supporting and writing plate 8, also acts as a holding device for the paper to prevent relative displacement thereof in both the feeding and tearing operation. To make the holding more effective, however, to insure against displacement of the paper webs relative to the feeding devices and to each other under all conditions of use, I have provided an additional holding device which is normally in such a position as to permit the free passage of the paper and which is actuated by the tearing operation to cause it to clamp the paper against the writing table or paper support, thereby coöperating with the feeding devices to hold the same firmly during the tearing operation, thus preventing excessive strain upon the perforated portions of the webs. As here shown this holding device is mounted transversely of the paper support at the forward end of the machine and is capable of rocking movement about a longitudinal axis. It is arranged above the forward portion of the writing table a distance sufficient to permit the free movement of the superimposed webs of paper. This device is here shown as a bar 28 pivotally mounted in bearings 29 on the forward portion of the cover 12, the bar serving to connect the forward ends of those portions of the cover lying on opposite sides of the exposed portion of the writing table and to form the forward wall of the opening in the cover. By mounting the paper holding device upon the cover I not only eliminate unnecessary metal and simplify the construction of the device but I am enabled to materially shorten the space between the exposed portion of the writing table and the point at which the check or bill is severed, thus greatly reducing the amount of paper between the edge of the bill and the written portion thereof, this paper being often a waste. Further, by mounting the holding device or bar on the cover it will be moved away from the paper support by the raising of the cover to permit access to the interior of the machine, whereas if mounted upon the side members it must be separately released and moved out of the way when it is desired to remove the paper support 8. The forward portion of the bar 28 constitutes a cutting edge along which the webs are torn or severed and this edge is for this purpose preferably beveled, as shown. That portion of the bar lying in front of its axis is preferably greater in weight than that portion lying in the rear of the axis so that the forward edge of the bar will rest normally upon the webs of paper but the weight thereof will not be sufficient to appreciably resist the feeding operation, and because of the arrangement of the axis of the bar the latter will be slightly tilted so as to lift the rear portion thereof out of engagement with the web of paper. The clearance between the rear edge of the bar and the uppermost web of paper is slight and when the webs have been fed forward and are drawn upward against the cutting edge for the purpose of severing the same, as shown in Fig. 4, the holding bar will be rocked about its axis and the rear edge thereof moved into engagement with the uppermost web of paper and caused to clamp the paper between the same and the writing table, thus effectually holding the webs against all displacement and relieving the apertured portions thereof, with which the feeding pins are in engagement, of strain. As soon as the severing operation has been completed the weight of the forward portion of the bar again moves the same into its inoperative position and it is ready for another feeding operation. In the present instance I have shown the rear portion of the bar as partially cut away between its ends to reduce the amount of metal and enable the proper distribution of the weight on the two sides of the axis without placing the axis greatly off center. This arrangement, however, is optional and the device will operate in a satisfactory manner with a continuous edge along the rear portion thereof. The holding bar 28 also serves to retain the webs of paper in engagement with the feeding pins 16. To this end the lower surface of the bar extends below the upper ends of the pins and is grooved, as shown at 30, to receive the pins and permit the rotation of the feeding device. The grooves 30 are narrow so that the bar engages the uppermost web of paper on the opposite sides of and close to the respective series of pins and in this manner prevents the uppermost web from being elevated sufficiently to permit the escape of the pin. In order to release each pin from the paper after that pin has accomplished its feeding function it is necessary to provide a stripping device of some sort. This I accomplish by extending the paper support forward to the end of the holding bar 28 and providing the same with longitudinal slots 31 to permit the passage of the pins of the feeding device. These slots are narrow and the paper support, on the opposite sides of the slots, holds the webs of paper against downward movement with the pins after the latter have accomplished their feeding function, and thus causes the pins to be withdrawn from their openings.

The paper feeding devices are held against rearward movement at any point in the operation thereof by means of a spring-pressed dog 32 engaging a toothed disk 33 secured to the shaft 14. When the disk 33 is rotated by means of the shaft 14 counter clockwise the teeth thereof will engage one side of the dog and raise the same out of engagement therewith. The teeth and dog, however, are so arranged as to prevent movement of the shaft 14 with its disk 33 clockwise. Because of the short distance between the uppermost pins on the feeding device and the forward edge of the holding bar it is desirable that the feeding device should be very firmly held against rearward movement at the end of the feeding operation as a very slight movement thereof might so far withdraw the pins from their openings as to permit the paper to be displaced. I have, therefore, provided a supplemental locking device which is operative only when the feeding device is in its normal or idle position. As has been noted the plate 22 which carries the gear 19 is in the form of a cam and this cam coöperates with a spring-pressed pin 34 mounted on the side frame member 1. The arrangement is such that at the end of the feeding operation the pin 34 will engage the shoulder of the cam and thus positively lock the same against rearward movement. The feeding device is automatically stopped at the end of each feeding operation by means of coöperating pins 35 and 36 carried by the side frame member 1 and the handle 21, respectively, the pin 36 being yieldable to permit it to be withdrawn, by manipulating the handle in a well known manner, when it is desired to again operate the feeding device. Thus at the end of each feeding operation the feeding mechanism is positively locked against accidental movement in either direction.

I have also provided guards to prevent the paper on the forward roll from coming in contact with the pins of the feeding device should this paper become slack on the roll. These guards comprise curved plates 37 and 38 secured to the respective side members of the frame and curved about the toothed portions of the feeding device. They may be secured to the side members of the frame in any suitable manner. In the present instance I have cast the guard 38 integral with the side member 2 but the guard 37 is formed separate from its side member and has that edge adjacent to the frame member cut away to form a slot to receive the intermediate gear 18.

The operation of the device will be readily understood from the foregoing description and it will be apparent that after the webs of paper have been properly threaded through the machine and the carbon sheets interleaved between the same the bill is written and the handle 21 operated to feed the written portion of the same out of the machine in a well known manner. Before and during this feeding operation the webs of paper are held in engagement with the pins of the feeding device by the grooved holder bar and are stripped from these pins by the forwardly extending portion of the writing table or paper support. At the end of the feeding operation the paper is torn across the edge of the bar 28 and this tearing operation actuates the bar to clamp the webs of paper against the paper support, thus acting together with the pins 16 of the feeding devices to firmly hold the same against displacement.

The mechanism is of an exceedingly simple charcter both in its construction and in its operation and is readily modified to adapt the same to bills of different lengths. Not only does this simplicity result in cheapening the production, but the resulting machine is of such a character that there are very few parts to become disarranged in a manner to interfere with or prevent the proper operation of the machine. Further, it will be noted that the paper holding devices are of such a character that no resistance is offered to the feeding of the paper but at the beginning of the tearing operation the devices firmly hold the paper and effectually prevent its displacement.

While I have shown and described one embodiment of my invention it will be understood that this has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In a device of the character described, a support for writing material, narrow longitudinally extending slots in said support spaced inwardly from the sides thereof, a feeding device arranged below said support, said feeding device having pins thereon projecting above said slots and support, and means above said support for severing the writing material and holding the same in engagement with said pins and against the support.

2. In a device of the character described, a support for writing material, narrow longitudinally extending slots in said support, a feeding device arranged below said support, said feeding device having pins thereon projecting above said slots and support, said support having a part arranged between said pins and extending forwardly thereof to strip the writing material from said pins, and means above said support and adjacent thereto for severing said writing material and holding the same in engagement with said pins and against the support.

3. In a device of the character described, a support for writing material, narrow longitudinally extending slots in said support, spaced inwardly from the sides thereof, a feeding device arranged below said support, said feeding device having pins thereon projecting above said slots and support, a cover having an opening therein mounted above said support and adjacent thereto, and means on said cover for severing the writing material and holding the same in engagement with said pins and against the support, said severing means constituting the forward boundary of said opening.

4. In a device of the character described, a support for a web of paper, a feeding device arranged beneath said support, a series of pins on said feeding device extending above said support to engage said web of paper, and means pivoted above said support and having a cutting edge, said last mentioned means being arranged to keep said web in engagement with said pins during the operation of the feeding device.

5. In a device of the character described, a support for a web of paper, a feeding device arranged beneath said support, a series of pins on said feeding device extending through said support to engage the web of paper, a cover above said support having an opening therein, a member pivoted at the forward edge of said cover and constituting the forward boundary of said opening, said member being located above said support and feeding device and arranged to keep said web of paper in engagement with said pins and against said support during the operation of said feeding device.

6. In a device of the character described, a support for a web of paper, a feeding device beneath said support and extending above the same, pins on said feeding device adapted to engage the web of paper, a pivoted cover above said support, and means pivoted thereon to keep said web in engagement with said pins and against said support, said last-mentioned means being located adjacent said pins.

7. In a device of the character described, a support for a web of paper, a feeding device arranged beneath said support, a series of pins on said feeding device extending through said support to engage the web of paper, a cover above said support, said cover having an opening at its forward end, a member having a cutting edge arranged at the forward edge of said cover, and constituting the forward boundary of said opening, and said member being located adjacent said pins to keep said web of paper in engagement therewith and against said support.

8. In a device of the character described, a support for a web of paper, a feeding device arranged beneath said support, a series of pins on said feeding device extending through said support to engage the web of paper, a member having a cutting edge pivoted above said support at the forward end thereof, said member being located above and adjacent to said series of pins, and means on said member to keep said web in engagement with said pins and against said support.

9. In a device of the character described, the combination, with a support over which a web of paper may be drawn, a rotary feeding device arranged beneath said support and having a circumferential series of pins projecting above the plane of said support and entering openings in the lateral edges of said web of paper, of a paper holding device comprising a bar pivotally mounted on an axis extending across said support and located between the front and rear edges of said bar, said bar being located above said series of pins and having grooves to receive the pins of the respective series, and means to retain said bar in engagement with the paper while the feeding device is rotating.

10. In a device of the character described, a frame comprising side members, a shaft journaled in the side members of said frame and having near the respective side members disk-like members each provided with a circumferential series of pins, means for rotating said shaft, a paper support carried by said frame having its forward end extending beyond said shaft and provided with longitudinal slots to permit the passage of the respective series of pins, said pins extending above the upper surface of said support when they are in their uppermost positions, and a paper holding bar arranged above said support on an axis substantially parallel with said shaft and arranged between the front and rear edge of said bar, said bar having in its lower surface grooves to receive the ends of said pins as said shaft is rotated.

11. In a device of the character described, a frame comprising side members, a shaft journaled in the side members of said frame and having near the respective side members disk-like members each provided with a circumferential series of pins, means for rotating said shaft, a paper support carried by said frame, having its forward end extending beyond said shaft and provided with longitudinal slots to permit the passage of the respective series of pins, said pins being arranged to extend above the upper surface of said support when they are in their uppermost positions, a cover hinged to said frame and having an opening to expose a part of said paper support, a paper holding bar pivotally mounted on the forward portion of said cover on an axis extending substantially parallel with said shaft and arranged between the front and rear edges of said bar, said bar having its forward edge arranged close to the forward edge of said paper support and having its rear portion arranged in the rear of the uppermost pin of each series, said bar having grooves in its lower surface to receive the ends of said uppermost pins.

12. In a device of the character described, a support over which a web of paper may be drawn, a feeding device comprising separated disk-like members rotatable about a common axis and each having a circumferential series of pins, said pins being arranged to extend above said support when in their uppermost positions and to enter openings arranged in the respective lateral edges of said web of paper, the forward edge of said support being arranged beyond the uppermost position of said pins and said support having slots to receive said pins, and a paper holding bar arranged above the forward portion of said support and mounted for movement about an axis extending transversely of said support and arranged between the front and rear edges of said bar, the forward edge of said bar constituting a paper cutter.

13. In a device of the character described, a paper support over which a web of paper may be drawn, a rotary feeding device having two circumferential series of teeth arranged near the respective sides of said paper support and projecting above the same to enter openings formed along the lateral edges of said web of paper, means to hold the paper on said support in engagement with said pins, said rotary feeding device comprising a gear secured thereto on an axis coincident with the axis thereof, a removable driving gear, means for rotating the same, an intermediate gear to connect said driving gear with said first-mentioned gear, a support for said intermediate gear movable about the axis of the first-mentioned gear, and means for securing said support in adjusted positions, whereby gears of different sizes may be substituted for said driving gear and connected with the first-mentioned gear by said intermediate gear.

14. In a device of the character described, a frame comprising side members, a paper support, over which a web of paper may be moved, carried by said frame, a rotary feeding device having two circumferential series of pins arranged near the respective sides of said paper support and projecting above the same to enter apertures formed along the lateral edges of said web of paper, said feeding device comprising a shaft journaled in the side members of said frame, a gear rigidly secured to said shaft, a driving gear mounted on one of the side members of said frame, an intermediate gear to connect said driving gear with the gear on said shaft, a supporting plate pivotally mounted on said shaft and carrying said intermediate gear, said plate having a plurality of openings arranged therein concentrically with the axis thereof, and openings in said frame member adapted to register with different openings in said plate when said plate is in different positions and to receive a fastening device to hold said plate against movement.

15. In a device of the character described, a frame comprising side members, and a paper feeding device comprising a shaft journaled in said side members, a gear rigidly secured to said shaft, a driving gear mounted on one of the side members of said frame, an actuating device for said driving gear, an intermediate gear to connect said driving gear with the gear on said shaft, a supporting plate pivotally mounted on said shaft and carrying said intermediate gear, said plate having a plurality of openings arranged therein concentric with the axis thereof, and openings in said frame member adapted to register with different openings in said plate when said plate is in different positions and to receive a fastening device to hold said plate against movement.

16. In a device of the character described, a paper support over which a web of paper may be moved, a rotary paper feeding device arranged beneath said paper support and having two circumferential series of teeth arranged to project above said support and enter apertures formed along the lateral edges of said web of paper, said support having slots to permit the passage of said pins, a device arranged above said support to hold said web of paper in a position to be engaged by said pins, means to prevent rearward movement of said feeding device at any point during the feeding operation, and a lock to positively lock said feeding device against rearward movement at the end of said feeding operation.

17. In a device of the character described, a paper support over which a web of paper may be moved, a rotary paper feeding device arranged beneath said paper support and having two circumferential series of teeth arranged to project above said support and enter apertures formed along the lateral edges of said web of paper, said support having slots to permit the passage of said pins, a device arranged above said support to hold said web of paper in a position to be engaged by said pins, a detent to prevent rearward movement of said feeding device at any point during the feeding operation, a lock to positively lock said feeding device against rearward movement at the end of said feeding operation, an actuating device for said feeding mechanism, and a stop to prevent the further movement of said actuating device at the end of a single feeding movement.

18. In a device of the character described, a support over which a web of paper may be drawn, a rotary feeding device arranged beneath said support and having means to engage said web of paper to feed the same, means to prevent rearward movement of said feeding device at any point during the feeding operation thereof, a lock to positively lock said feeding device against rearward movement at the end of said feeding operation, and means to prevent further forward movement of said feeding device at the end of said feeding operation.

19. In a device of the character described, a support over which a web of paper may be drawn, a rotary feeding device arranged beneath said support and having means to engage said web of paper to feed the same, means to prevent rearward movement of said feeding device during the operation, and a lock to positively lock said feeding device against rearward movement at the end of said feeding operation.

20. In a device of the character described, a support over which a web of paper may be drawn, a rotary feeding device arranged beneath said support and having means to engage said web of paper to feed the same, means to prevent rearward movement of said feeding device at any point during the feeding operation, and a lock comprising a cam having a stop, and a yielding pin to positively lock said feeding device against rearward movement at the end of said feeding operation.

21. In a device of the character described, a support for writing material, having longitudinally extending slots at opposite sides thereof, feeding devices for the writing material mounted in vertical alinement with said slots, said feeding devices having material engaging projections extending through said slots and above said support, and means coöperating with said plate to hold the writing material in engagement with the feeding devices.

22. In a device of the character described, a support for writing material, having longitudinally extending slots at opposite sides thereof, feeding devices for the writing material mounted in vertical alinement with said slots, said feeding devices having a series of peripheral pins extending through said slots and engaging suitably spaced apertures in said material, whereby to feed the same forward over said plate, and means coöperating with said plate to hold the writing material in engagement with the feeding devices.

23. In a device of the character described, a support for writing material, having longitudinally extending slots at opposite sides thereof, feeding devices for the writing material mounted in vertical alinement with said slots, said feeding devices having a series of peripheral pins extending through said slots and engaging suitably spaced apertures in said material, whereby to feed the same forward over said plate, and means coöperating with said plate to hold the writing material in engagement with the feeding devices, said plate having a portion extending forwardly of the feeding devices and coöperating therewith to release the writing material from said pins.

24. In a device of the character described, a support for writing material, longitudinally extending slots in said support spaced inwardly from the sides thereof, a feeding device for said material arranged below said support and having projections extending through said slots and above said support whereby to feed said material forward over said support, and means for holding the material in engagement with the feeding device.

25. In a device of the character described, a support for writing material, longitudinally extending slots in said support spaced inwardly from the sides thereof, a feeding device for said material arranged below said support and having pins extending through said slots and engaging suitably spaced apertures in said material whereby to feed the same over said support, and means for holding the material in engagement with the feeding device.

26. In a device of the character described, a support for writing material, longitudinally extending slots in said support spaced inwardly from the sides thereof, a feeding device for said material arranged below said support and having pins extending through said slots and engaging suitably spaced apertures in said material whereby to feed the same over said support, a cover mounted above said support, and means on said cover to hold said material in engagement with the feeding devices, said support having portions thereof extending along the sides and forwardly of the feeding device to release the material as it is fed forwardly thereof.

27. In a device of the character described, a support for a plurality of webs of writing material having evenly spaced apertures therein substantially coinciding in the respective webs, feeding devices arranged at opposite sides of said support and having peripheral pins projecting therethrough and engaging said alined apertures, whereby to feed said webs equally forward over said support, and means to hold the webs in engagement with said pins to prevent relative displacement thereof.

28. In a device of the character described, a support for a plurality of webs of writing material having evenly spaced apertures therein substantially coinciding in the respective webs, feeding devices coöperating with said support and having peripheral pins projecting therethrough and engaging said alined apertures whereby to feed said webs equally forward over said support, means to hold the webs in engagement with said pins to prevent relative displacement thereof, and means coöperating with said support whereby to sever the portion of said webs fed forward of the feeding devices.

In testimony whereof I affix my signature.

AXEL C. V. MALM.